(12) United States Patent
Butzmann

(10) Patent No.: US 7,119,534 B2
(45) Date of Patent: Oct. 10, 2006

(54) MAGNETIC POSITION SENSOR

(75) Inventor: Stefan Butzmann, Hagen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/538,615

(22) PCT Filed: Dec. 10, 2003

(86) PCT No.: PCT/IB03/05990

§ 371 (c)(1),
(2), (4) Date: Jun. 10, 2005

(87) PCT Pub. No.: WO2004/055481

PCT Pub. Date: Jul. 1, 2004

(65) Prior Publication Data
US 2006/0066297 A1    Mar. 30, 2006

(30) Foreign Application Priority Data
Dec. 18, 2002 (EP) .................................. 02102796

(51) Int. Cl.
*G01B 7/14* (2006.01)
(52) U.S. Cl. .......................... 324/207.21; 324/207.24; 324/207.2
(58) Field of Classification Search .................... None
See application file for complete search history.

(56) References Cited
U.S. PATENT DOCUMENTS
4,570,118 A * 2/1986 Tomczak et al. ......... 324/207.2

6,753,680 B1 * 6/2004 Wolf ........................ 324/207.2

FOREIGN PATENT DOCUMENTS
DE    195 30 386 A1    2/1997

* cited by examiner

*Primary Examiner*—Jay M. Patidar
(74) *Attorney, Agent, or Firm*—Peter Zawilski; Aaron Waxler; Paul Im

(57) ABSTRACT

What is described is a configuration for determining the position of a body on an at least largely linear motion coordinate, along which two magnetic configurations are disposed, each equipped with at least one pair of magnetic north and south poles, and disposed between the magnetic configurations is a magnetoresistive angle-sensor configuration, which is set up to measure the direction of a resultant magnetic field spanned by the magnetic configurations and extending between them in a measurement plane relative to a spatial reference direction lying in this measurement plane. The motion coordinate is aligned at least largely at right angles to the measurement plane of the magnetoresistive angle-sensor configuration, and magnetic axes of the two magnetic configurations extend essentially parallel to the measurement plane and projections of these magnetic axes onto the measurement plane are aligned to be offset by predetermined angles relative to one another. At least a first of the magnetic configurations is connected to the body and disposed to be mobile, together with the latter, relative to the magnetoresistive angle-sensor configuration along the motion coordinate. As a result, a configuration for determining the position of a body with the aid of an angle sensor in cases of an at least largely linear motion is created.

9 Claims, 4 Drawing Sheets

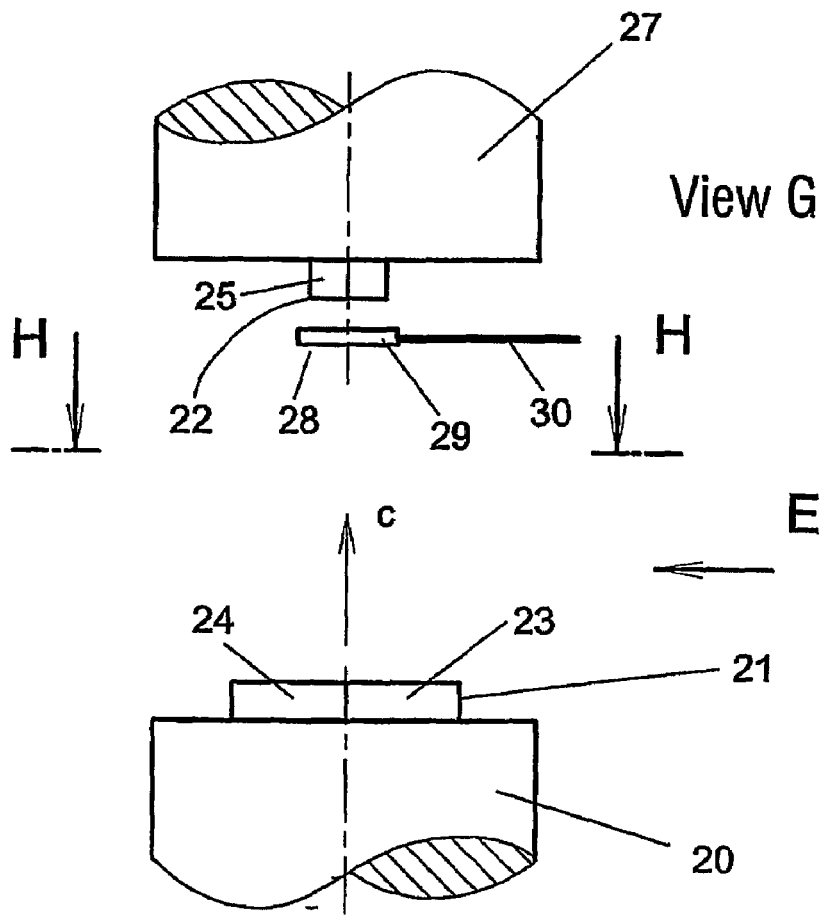
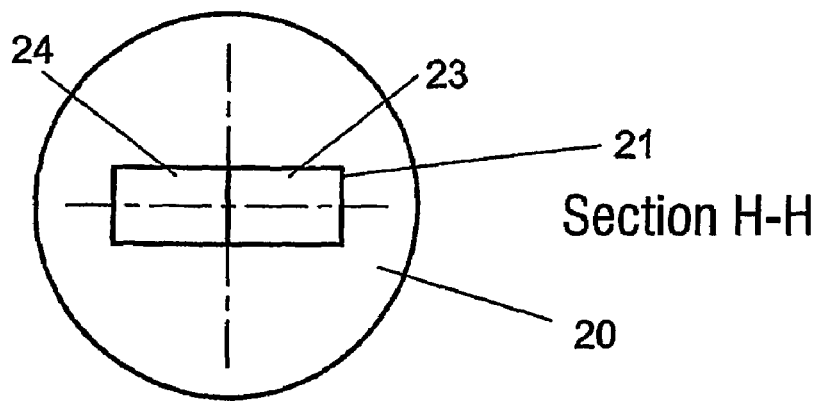
FIG.8

MAGNETIC POSITION SENSOR

The invention relates to a configuration for determining the position of a body.

It is known for magnetoresistive sensors to be used for measuring magnetic fields. Among the most frequent applications hereby is their use as speed sensors in anti-locking systems for vehicle braking systems and as angle sensors. However, magnetoresistive sensors, in particular those designated AMR sensors, are seldom used currently to determine an essentially linear motion, wherein this very thing is desirable in new application areas in automotive technology.

A position sensor with at least two non-contact sensor units for measuring a position of an element that is disposed to be mobile relative to the sensor units is known from DE 195 30 386 A1. Generated from sensor signals from the sensor units is a measurement signal, from the phase position of which relative to a clock signal, the position of the element disposed to be mobile relative to the sensor units can be determined. This position may hereby be an angle or a linear position.

An angle sensor with at least two non-contact sensor units, disposed to be offset at an angle relative to each other, is known from EP 0 671 605 A2, the sensor voltages of which sensor units are homogeneous sinusoidal functions (sensor characteristics) of the angle to be measured relative to a rotatable element, but running at an angular offset. This angle sensor is disposed on a chip and comprises on this chip two sensor units with bridge elements interleaved within one another in such a way that a bridge element of one of the sensor units is followed by a bridge element of the other sensor element with a 45° spatial shift about a common center point. An angle-sensor voltage constituting a gauge of the angle to be measured can be unambiguously generated over an angular range of up to 180° by means of an evaluation circuit coupled with the bridge elements.

Compared with other sensors, AMR angle sensors of this kind, which determine the angle of an adjacent magnetic field with two full bridges offset by 45° and by means of an algorithm, have the advantage of a high absolute accuracy in a wide temperature range. It is therefore desirable to call upon sensors of this kind to determine the position of an element executing an essentially linear motion.

It is an object of the invention to create a configuration for determining the position of a body with the aid of an angle sensor in the case of a motion that is at least largely linear.

This object is achieved in accordance with the invention by means of a configuration for determining the position of a body on an at least largely linear motion coordinate, along which two magnetic configurations are disposed, each equipped with at least one pair of magnetic north and south poles, and disposed between the magnetic configurations is a magnetoresistive angle-sensor configuration, which is set up to measure the direction of a resultant magnetic field spanned by the magnetic configurations and extending between them in a measurement plane relative to a spatial reference direction lying in this measurement plane, wherein the motion coordinate is aligned at least largely at right angles to the measurement plane of the magnetoresistive angle-sensor configuration, and wherein magnetic axes of the two magnetic configurations extend essentially parallel to the measurement plane and projections of these magnetic axes onto the measurement plane are aligned to be offset by predetermined angles relative to one another, and wherein at least a first of the magnetic configurations is connected to the body and disposed to be mobile, together with the latter, relative to the magnetoresistive angle-sensor configuration along the motion coordinate. The direction of the magnetic field lines between their south pole and their north pole is hereby designated the magnetic axis of a magnetic configuration.

In the configuration in accordance with the invention, by virtue of the magnetic configurations, with their magnetic axes offset relative to each other, a resultant magnetic field is now spanned in a subspace extending between the magnetic configurations along the motion coordinate, the magnetic field lines of which run essentially helically. This resultant magnetic field comprises a field component aligned in the measurement plane, the direction of which field component in the measurement plane changes, along the motion coordinate, relative to the spatial reference direction located within this measurement plane. If the position of the magnetoresistive angle-sensor configuration along the motion coordinate is changed relative to the field lines of the resultant magnetic field formed in this way, the direction of the field component of the resultant magnetic field measured by the magnetoresistive angle-sensor configuration in the measurement plane changes simultaneously.

An essentially linear motion of the body along the motion coordinate is thereby translated, in a simple manner, by the configuration in accordance with the invention into a rotary motion of the field lines of the resultant magnetic field in the measurement plane. This rotary motion can be detected extremely precisely with the magnetoresistive angle-sensor configuration. This give rise to a simple, robust, and simultaneously very precise, measuring configuration for determining the position of a body, which can be used advantageously in environments in which it is subjected to high mechanical and/or thermal stresses. The configuration in accordance with the invention can therefore be used preferably in automotive engineering, in particular in applications where, despite the said stresses, very precise measurements are required.

In accordance with a preferred embodiment of the invention, a second of the magnetic configurations and the magnetoresistive angle-sensor configuration are disposed with fixed spacing between them along the motion coordinate. In this embodiment of the invention, the positions of the second magnetic configuration and the magnetoresistive angle-sensor configuration are fixed relative to the motion coordinate, and the first magnetic configuration with the body is moved jointly with it along the motion coordinate. As a result, the dimension of the subspace extending between the magnetic configurations along the motion coordinate, in which subspace the resultant magnetic field is spanned, is changed with the motion of the first magnetic configuration, and thereby of the body, along the motion coordinate. This also changes the distribution of the magnetic field lines of the resultant magnetic field in the subspace extending along the motion coordinate between the magnetic configurations, here moved in opposition, in such a way that the helical characteristic of the field lines is steeper or shallower, depending on the spacing of the magnetic configurations. In the magnetoresistive angle-sensor configuration, which, together with the second magnetic configuration, is in fixed arrangement relative to the motion coordinate, the direction of the field component of the resultant magnetic field formed and measured in the measurement plane changes simultaneously in accordance with the motion of the first magnetic configuration together with the body. The direction of the field component of the resultant magnetic field measured in the measurement plane by the magnetoresistive angle-sensor configuration thereby constitutes a direct gauge of the motion of the body along the motion coordinate.

In accordance with a different preferred embodiment of the invention, the first and the second magnetic configuration are connected to the body at a fixed distance from one another and disposed so they can be moved jointly with it relative to the magnetoresistive angle-sensor configuration along the motion coordinate. In this embodiment of the invention, the magnetoresistive angle-sensor configuration is fixed relative to the motion coordinate, and the first and second magnetic configurations are moved jointly with the body along the motion coordinate. As a result, the dimension of the subspace extending between the magnetic configurations along the motion coordinate, in which subspace the resultant magnetic field is spanned, and thereby also the field distribution of the resultant magnetic field in this subspace, are unchanged when the body is moved. Only the position of the magnetoresistive angle-sensor configuration relative to the resultant magnetic field changes here as the body moves. However, by virtue of the helical form of the field distribution of the resultant magnetic field in the said subspace, the direction of the field component of the resultant magnetic field formed and measured in the measurement plane now also changes in the magnetoresistive angle-sensor configuration in accordance with the motion of the magnetic configurations and the body. The direction of the field component of the resultant magnetic field measured in the measurement plane by the magnetoresistive angle-sensor configuration thereby constitutes a direct gauge of the motion of the body along the motion coordinate in this configuration also.

The present invention of course also comprises the configurations with the said body, the said magnetic configurations and the said magnetoresistive angle-sensor configuration, which arise through kinematic reversal of the described configurations and combinations of these elements. So, for example, the body may be combined with the magnetoresistive angle-sensor configuration and this combined element may be disposed to be movable jointly relative to the magnetic configurations along the motion coordinate. The body and one of the said magnetic configurations may also be combined with e.g. the magnetoresistive angle-sensor configuration, and this combined element may be disposed to be movable jointly relative to the other of the said magnetic configurations along the motion coordinate, etc.

In an advantageous development of the invention, the projections of the magnetic axes of the first and second magnetic configurations onto the measurement plane enclose an angle of at least virtually 90°. This choice of the angle enclosed by the projections of the magnetic axes of the magnetic configurations provides the highest possible development of the helical shape of the magnetic field lines of the resultant magnetic field. In selecting the angle enclosed by the projections of the magnetic axes of the magnetic configurations, account is preferably taken of the angular dimension at which the magnetoresistive angle-sensor configuration used delivers a clear signal.

The configuration in accordance with the invention is advantageously used in the automotive field. In particular, the body whose position is to be determined is hereby a mobile component of a motor vehicle. Preferably, the body is a mobile component of a combustion engine or of a braking system for a motor vehicle. One advantageous application of the invention also obtains when the body is a mobile component of a chassis for a motor vehicle, in particular of a shock absorber for a motor vehicle. When movement of components of this kind takes place, the position is simply, reliably and precisely determined with the configuration in accordance with the invention. In particular, the robustness of configurations of this kind in response to the typical stresses in the automotive field, as well as their compact, space- and weight-saving design, also make themselves felt to advantage.

The invention will be further described with reference to examples of embodiments shown in the drawings, to which, however, the invention is not restricted.

FIG. 7 shows, schematically, a side view (view G) of the configuration for determining the position of the body in accordance with the second embodiment example of the invention.

FIG. 8 shows, schematically, a sectional view of the configuration for determining the position of the body in accordance with the second embodiment example of the invention in the sectional plane H—H shown in FIG. 7.

Figure 1:
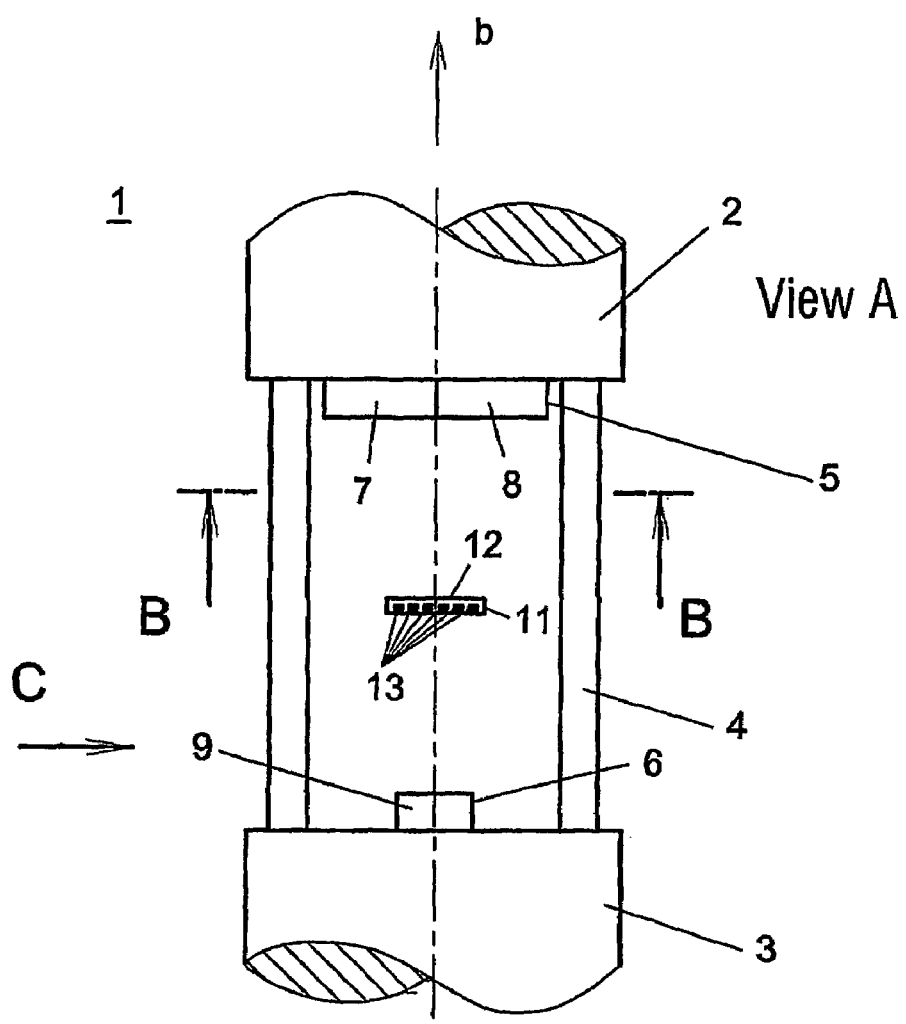
FIG. 1 shows, schematically, a front view (view A) of a configuration for determining the position of a body in accordance with a first embodiment example of the invention.

FIG. 1 shows, schematically in front view, designated "view A" in the Figures, an essentially piston-shaped body 1, the position of which on an at least largely linear motion coordinate b is to be determined, as a first embodiment example of the invention. To this end, the body 1 is designed with a first piston-shaped part 2, a second piston-shaped part 3 and a land-shaped part 4 connecting these two parts. The motion coordinate b in the present embodiment example coincides with the longitudinal axis of the body 1, i.e. in particular of its piston-shaped parts 2 and 3. Disposed along motion coordinate b are two magnetic configurations 5 and 6, which, in the present embodiment example, are designed as permanent magnets, each equipped with a pair of magnetic north and south poles, 7 and 9 respectively and 8 and 10 respectively. A first of these magnetic configurations, i.e. a first of these permanent magnets, having the reference number 5, is hereby connected to the first piston-shaped part 2 of the body 1 and is equipped with the north pole having the reference number 7, and the south pole having the reference number 8. A second of these permanent magnets, having the reference number 6, is connected to the second piston-shaped part 3 of the body 1 and is equipped with the north pole having the reference number 9, and the south pole having the reference number 10.

Figure 2:
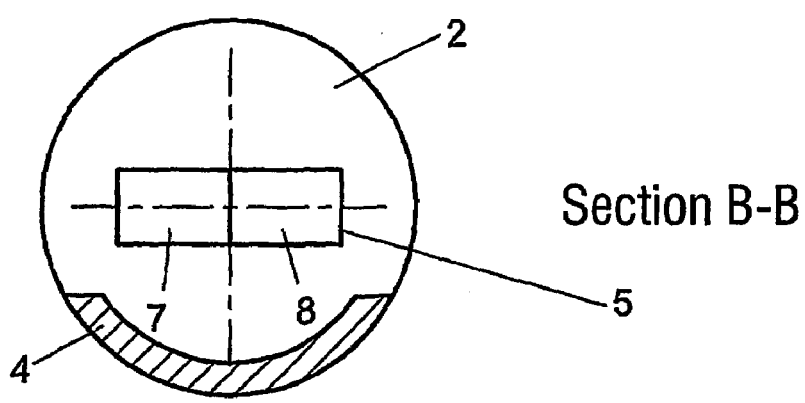
FIG. 2 shows, schematically, a sectional view of the configuration for determining the position of the body in accordance with the first embodiment example of the invention in accordance with FIG. 1 in the sectional plane B—B shown therein.
Figure 3:
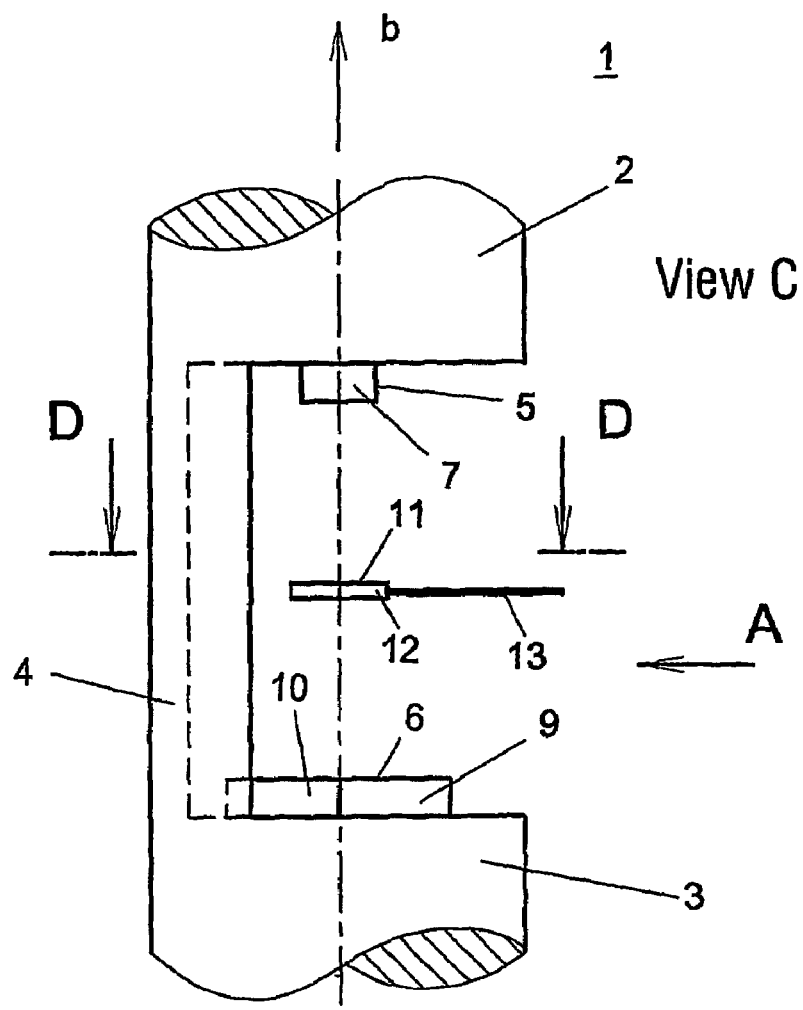
FIG. 3 shows, schematically, a side view (view C) of the configuration for determining the position of the body in accordance with the first embodiment example of the invention.
Figure 4:
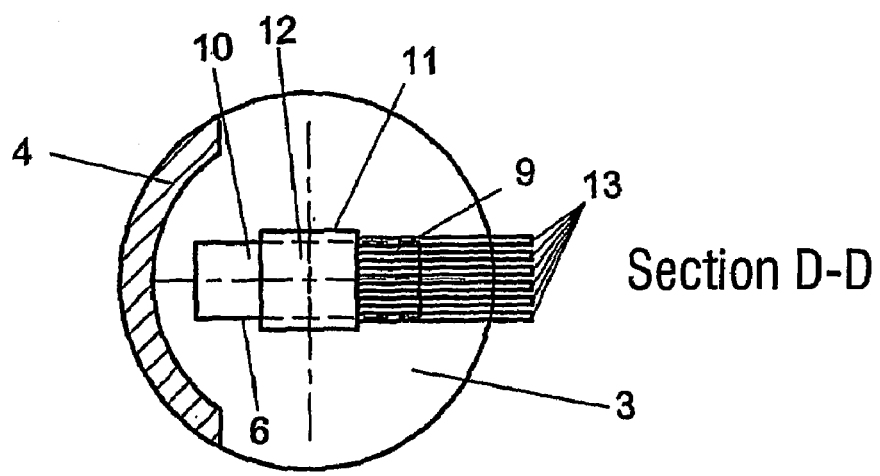
FIG. 4 shows, schematically, a sectional view of the configuration for determining the position of the body in accordance with the first embodiment example of the invention in the sectional plane D—D shown in FIG. 3.

To explain the spatial configuration of the body 1 and the permanent magnets 5, 6, a sectional view of the configuration in accordance with FIG. 1, through the sectional plane B—B shown therein, is shown in FIG. 2, a side view—designated "view C" in the Figures—is shown in FIG. 3, and a sectional view through the sectional plane D—D shown in FIG. 3 is shown in FIG. 4.

In the configuration described, the permanent magnets 5, 6 are aligned with their magnetic axes parallel with a plane on which the motion coordinate b is located vertically, which is designated the measurement plane hereafter. This measurement plane runs parallel with the sectional planes B—B and D—D. Projections of the magnetic axes of the permanent magnets 5 and 6 are also aligned onto the measurement plane so as to be offset from each other by a predetermined angle, which is 90° in the embodiment example shown. By virtue of the permanent magnets 5 and 6, with their magnetic axes offset relative to each other in this manner, a resultant magnetic field is now spanned in a subspace extending between the permanent magnets 5 and 6 along the motion coordinate b, the magnetic field lines of which run essentially helically. This resultant magnetic field, the field lines of which are not shown for reasons of clarity, comprises a field component aligned in the measurement plane, the direction of which field component in the measurement plane changes, along the motion coordinate b, relative to a spatial reference direction located within this measurement plane.

In the configuration in accordance with FIG. 1 to FIG. 4, disposed between the permanent magnets 5, 6 is a magnetoresistive angle-sensor configuration 11, which is set up to measure the direction of a field component of the resultant magnetic field spanned by the permanent magnets 5, 6 in the measurement plane. In FIG. 1 to FIG. 4, a housing 12 of the magnetoresistive angle-sensor configuration 11 is shown, which housing comprises an AMR (Anisotropic MagnetoResistive) angle-sensor module, as known per se from e.g. EP 0 671 605 A2. Further shown schematically are terminals 13, with which the magnetoresistive angle-sensor configuration 11 is connected, in a practical version, to signal evaluation configurations, which are not shown here.

If the position of the magnetoresistive angle-sensor configuration 11 along the motion coordinate b is now changed relative to the field lines of the resultant magnetic field, the direction of the field component of the resultant magnetic field measured by the magnetoresistive angle-sensor configuration 11 in the measurement plane changes simultaneously. The direction of the field component of the resultant magnetic field measured by the magnetoresistive angle-sensor configuration 11 in the measurement plane thereby corresponds to the direction of the magnetic axis of the permanent magnet 5, which is connected to the first piston-shaped part 2 of the body 1, when the magnetoresistive angle-sensor configuration 11 has been shifted along the motion coordinate b fully as far as the first piston-shaped part 2 of the body 1. If, on the other hand, the magnetoresistive angle-sensor configuration 11 is shifted along the motion coordinate b fully as far as the second piston-shaped part 3 of the body 1, the direction of the field component of the resultant magnetic field measured by the magnetoresistive angle-sensor configuration 11 in the measurement plane corresponds to the direction of the magnetic axis of the permanent magnet 6 connected to the second piston-shaped part 3 of the body 1, and is thereby rotated 90°.

This direction measured by the magnetoresistive angle-sensor configuration 11 in the measurement plane is thereby a direct gauge of the position of the magnetoresistive angle-sensor configuration 11 along the motion coordinate b. In the case of a movement of the body 1, together with the permanent magnets 5, 6, along the motion coordinate b relative to the magnetoresistive angle-sensor configuration 11, the direction measured by the magnetoresistive angle-sensor configuration 11 in the measurement plane is a direct gauge of the position of the body 1 on the motion coordinate b.

Figure 5:
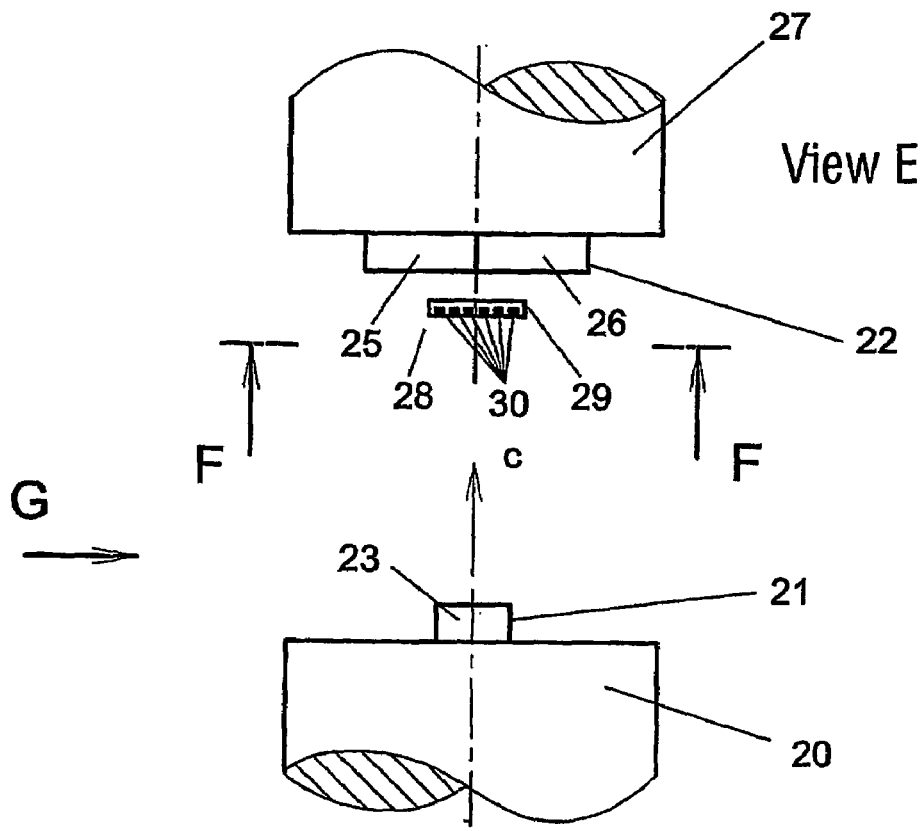
FIG. 5 shows, schematically, a front view (view E) of a configuration for determining the position of a body in accordance with a second embodiment example of the invention.

FIG. 5 shows, schematically, as a second embodiment example of the invention, in a front view—designated "view E" in the Figures—a body 20, here again essentially piston-shaped, for example, the position of which on an at least largely linear motion coordinate c is to be determined. The motion coordinate c in the present embodiment example coincides with the longitudinal axis of the body 20. Disposed along the motion coordinate c are two magnetic configurations 21 and 22, which, in the present embodiment example, take the form of permanent magnets, each equipped with a pair of magnetic north and south poles, 23 and 25 respectively and 24 and 26 respectively. A first of these magnetic configurations, i.e. a first of these permanent magnets, having the reference number 21, is hereby connected to the piston-shaped body 20 and is equipped with the north pole having the reference number 23, and the south pole having the reference number 24. A second of these permanent magnets, having the reference number 22, is connected to the part 27, which is fixed relative to the motion coordinate c and is also piston-shaped in the example shown, and which forms a counterpart to the body 20 and is equipped with the north pole having the reference number 25, and the south pole having the reference number 26.

Figure 6:
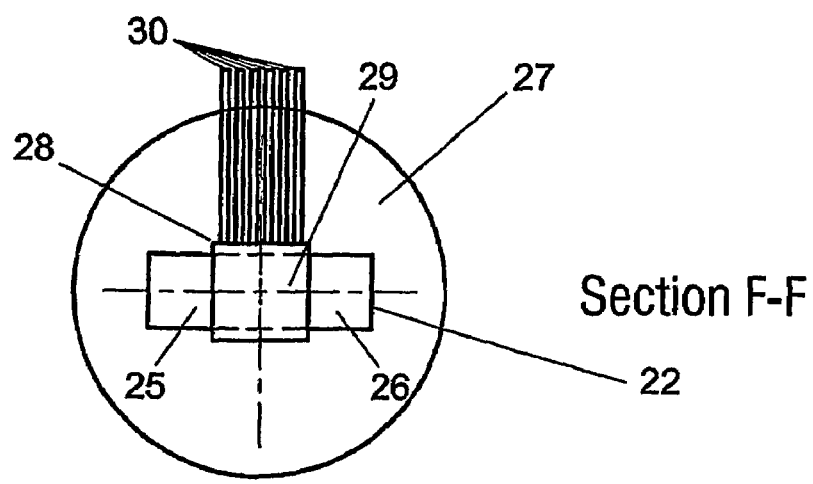
FIG. 6 shows, schematically, a sectional view of the configuration for determining the position of the body in accordance with the second embodiment example of the invention in accordance with FIG. 5 in the sectional plane F—F shown therein.

To explain the spatial configuration of the body 20 and the permanent magnets 21, 22, a sectional view of the configuration in accordance with FIG. 5, through the sectional plane F—F shown therein, is shown in FIG. 6, a side view—designated "view G" in the Figures—is shown in FIG. 7, and a sectional view through the sectional plane H—H shown in FIG. 7 is shown in FIG. 8.

In the configuration described, the permanent magnets 21, 22 are aligned with their magnetic axes parallel with a plane on which the motion coordinate c is located vertically, which is designated the measurement plane hereafter. This measurement plane runs parallel with the sectional planes F—F and H—H. Projections of the magnetic axes of the permanent magnets 21 and 22 are also aligned onto the measurement plane so as to be offset from each other by a predetermined angle, which is 90° in the embodiment example shown. By virtue of the permanent magnets 21 and 22, with their magnetic axes offset relative to each other in this manner, a resultant magnetic field is now spanned in a subspace extending between the permanent magnets 21 and 22 along the motion coordinate c, the magnetic field lines of which run essentially helically. This resultant magnetic field, the field lines of which are not shown for reasons of clarity, comprises a field component aligned in the measurement plane, the direction of which field component in the measurement plane changes, along the motion coordinate c, relative to a spatial reference direction located within this measurement plane.

In the configuration in accordance with FIG. 5 to FIG. 8, disposed between the permanent magnets 21, 22 is a magnetoresistive angle-sensor configuration 28, which is set up to measure the direction of a field component of the resultant magnetic field spanned by the permanent magnets 21, 22 in the measurement plane. In FIG. 5 to FIG. 8, a housing 29 of the magnetoresistive angle-sensor configuration 28 is shown, which housing comprises an AMR (Anisotropic MagnetoResistive) angle-sensor module, as known per se from e.g. EP 0 671 605 A2. Further shown schematically are terminals 30, with which the magnetoresistive angle-sensor configuration 28 is connected, in a practical version, to signal evaluation configurations, which are not shown here. As with the piston-shaped part 27, which carries the second permanent magnet 22, the magnetoresistive angle-sensor configuration 28 is disposed to be fixed relative to the motion coordinate c in this embodiment example.

According to this embodiment example of the invention, the second permanent magnet 22 and the magnetoresistive angle-sensor configuration 28 are disposed at a fixed distance from each other along the motion coordinate c. The first permanent magnet 21 is moved, together with the body 20, along the motion coordinate c. As a result, the dimension of the subspace extending between the permanent magnets 21, 22 along the motion coordinate c and in which the resultant magnetic field is spanned, is changed with the motion of the first permanent magnet 21, and thereby of the body 20, along the motion coordinate c. This also changes the distribution of the magnetic field lines of the resultant magnetic field in the subspace extending along the motion coordinate c between the permanent magnets 21, 22, here moved in opposition, in such a manner that the helical characteristic of the field lines is steeper or shallower, depending on the spacing of the permanent magnets 21, 22. In the magnetoresistive angle-sensor configuration 28, which, together with the second permanent magnet 22, is in fixed arrangement relative to the motion coordinate c, the direction of the field component of the resultant magnetic field formed and measured in the measurement plane changes simultaneously in accordance with the motion of the first permanent magnet 21 together with the body 20. The direction of the field component of the resultant magnetic field measured in the measurement plane by the magnetoresistive angle-sensor configuration 28 thereby constitutes a direct gauge of the motion of the body 20 along the motion coordinate c.

In particular, the direction of the field component of the resultant magnetic field measured by the magnetoresistive angle-sensor configuration 28 in the measurement plane thereby corresponds to the direction of the magnetic axis of the first permanent magnet 21 when the body 20 has been shifted along the motion coordinate c fully as far as the magnetoresistive angle-sensor configuration 28. If, on the other hand, the body 20 is shifted along the motion coordinate c in the opposite direction and assumes a distance from the magnetoresistive angle-sensor configuration 28 that is large compared with the distance between the magnetoresistive angle-sensor configuration 28 and the second permanent magnet 22, the direction of the field component measured by the magnetoresistive angle-sensor configuration 28 in the measurement plane corresponds to the resultant magnetic field of the direction of the magnetic axis of the second permanent magnet 22, and is thereby rotated 90°.

This direction measured in the measurement plane by the magnetoresistive angle-sensor configuration 28 thereby constitutes a direct gauge of the position of the body 20 on the motion coordinate c.

The field-line rotation described, i.e. the variation of the direction of the field component of the resultant magnetic field that can be measured along the motion coordinate in the measurement plane, which is brought about by the helical form of the resultant magnetic field, and which can be reliably determined with the angle-sensor configuration, is moreover independent of any variation of the absolute value of the magnetic field strength, provided the angle-sensor configuration is operated in saturation.

Especially in the case of a design in accordance with the second embodiment example, the measured relationship between the motion coordinate and the angle of the field component measured by the angle-sensor configuration may be non-linear. This relationship between the position of the body and the angle of the field lines is then preferably linearized by a corresponding inverse transformation of signals emitted by the angle-sensor configuration.

The invention claimed is:

1. A configuration for determining the position of a body on an at least largely linear motion coordinate, along which two magnetic configurations are disposed, each equipped with at least one pair of magnetic north and south poles, and disposed between the magnetic configurations is a magnetoresistive angle-sensor configuration, which is set up to measure the direction of a resultant magnetic field spanned by the magnetic configurations and extending between them in a measurement plane relative to a spatial reference direction lying in this measurement plane, wherein the motion coordinate is aligned at least largely at right angles to the measurement plane of the magnetoresistive angle-sensor configuration, and wherein magnetic axes of the two magnetic configurations extend essentially parallel to the measurement plane and projections of these magnetic axes onto the measurement plane are aligned to be offset by predetermined angles relative to one another, and wherein at least a first of the magnetic configurations is connected to the body and disposed to be mobile, together with the latter, relative to the magnetoresistive angle-sensor configuration along the motion coordinate.

2. A configuration as claimed in claim 1, characterized in that a second of the magnetic configurations and the magnetoresistive angle-sensor configuration are disposed with fixed spacing between them along the motion coordinate.

3. A configuration as claimed in claim 1, characterized in that the first and the second magnetic configuration are connected to the body at a fixed distance from one another and disposed so they can be moved jointly with it relative to the magnetoresistive angle-sensor configuration along the motion coordinate.

4. A configuration as claimed in claim 1, characterized in that the projections of the magnetic axes of the first and second magnetic configurations onto the measurement plane enclose an angle of at least virtually 90°.

5. A configuration as claimed in claim 1, characterized in that the body is a mobile component of a motor vehicle.

6. A configuration as claimed in claim 5, characterized in that the body is a mobile component of a combustion engine for a motor vehicle.

7. A configuration as claimed in claim 5, characterized in that the body is a mobile component of a braking system for a motor vehicle.

8. A configuration as claimed in claim 5, characterized in that the body is a mobile component of a chassis for a motor vehicle.

9. A configuration as claimed in claim 8, characterized in that the body is a mobile component of a shock absorber for a motor vehicle.

* * * * *